न/a

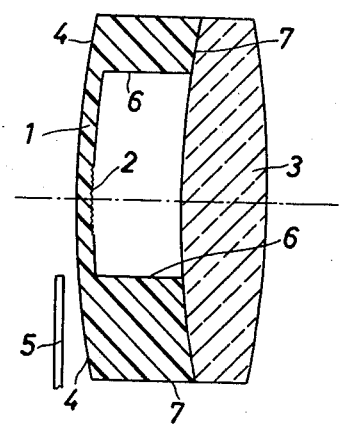
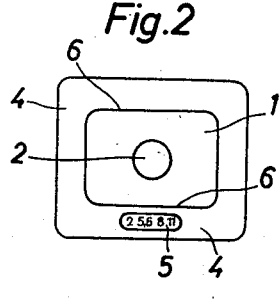
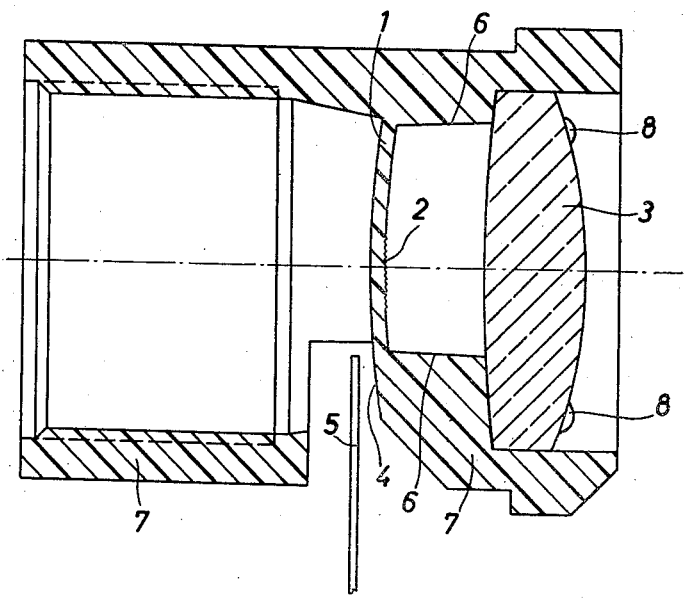

United States Patent Office 3,188,931
Patented June 15, 1965

3,188,931
VIEWFINDER STRUCTURES
Franz Koehler, Munich, and Georg Koenigl, Munich-Pasing, Germany, assignors to Agfa Aktiengesellschaft, Leverkusen-Bayerwerk, Germany, a corporation of Germany
Filed July 19, 1962, Ser. No. 210,954
Claims priority, application Germany, July 25, 1961,
A 17,072
1 Claim. (Cl. 95—44)

The present invention relates to viewfinders used with motion picture or still cameras for viewing the subject which is to be photographed.

One of the objects of the present invention is to provide a viewfinder which is not only capable of indicating when the objective is properly focused on the subject but which also is capable of indicating to the operator, during viewing of the subject through the viewfinder, additional information regarding the operation of the camera.

A further object of the present invention is to provide a viewfinder which can accomplish the above functions and which at the same time has an extremely simple, inexpensive, reliable construction.

A further object of the present invention is to provide a viewfinder structure of the above type which on the one hand is capable of protecting elements of the viewfinder from dust particles and other undesirable influences and which on the other hand is capable of providing proper operation even if exterior surfaces of the viewfinder should become dirty as by being smudged, for example.

Still another object of the present invention is to provide a viewfinder structure of the above type which is capable of providing bright, sharp images of the subject as well as of indicia pertaining to the operation of the camera.

With the above objects in view the invention includes, in a viewfinder, a transparent disc located in the focal plane of the viewfinder and having on one of its faces a series of small ridges of prismatic cross section which become invisible when the objective is properly focused on a subject whose image is seen in the viewfinder so that so long as the operator sees these ridges he knows that the objective has not been properly focused on the subject. In accordance with the invention this disc is fixed to a lens which is located beyond the field of the viewfinder and which is capable of providing a sharp image of a scale, index, or the like providing information pertaining to the operation of the camerafinder, and this lens and disc are preferably formed integrally with each other.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 illustrates in a longitudinal sectional view one embodiment of a viewfinder structure according to the present invention;

FIG. 2 illustrates what is seen with the viewfinder structure of FIG. 1; and

FIG. 3 is a longitudinal sectional view of another embodiment of a viewfinder structure according to the invention.

Referring to the drawings, it will be seen that there is illustrated therein a disc 1 which is made of any suitable transparent material and which is located in the focal plane of the viewfinder. The structure is particularly adapted for use with reflex cameras, of the motion picture or still type, where, as is well known in the art, an image of the subject to be photographed is reflected into the viewfinder so as to be visible in the field of the viewfinder. This is in distinction to those types of cameras where the operator views the subject directly through the viewfinder. As is apparent from the drawings, the right face of the disc 1 is formed with a number of small prisms 2 formed on the right face of the transparent disc 1 as viewed in FIGS. 1 and 3 of the drawings. With this construction, if the objective of the camera is not properly focused on the subject which is to be photographed then the ridges 2 are visible to the operator who views the image of the subject in the viewfinder, while when the objective is precisely focused on the subject to be photographed a bright image of the subject is seen by the operator in the viewfinder and the ridges 2 disappear, the entire disc 1 becoming apparently completely transparent. If there is the slightest degree of lack of precise focusing of the objective on the subject then the ridges 2 are clearly visible to the operator. Although the disc 1 is shown as being slightly curved so that the face thereof which carries the ridges 2 is concave, it is also possible to make the disc 1 flat, if desired. Because the disc 1 is located in the focal plane of the viewfinder its surfaces do not in any way detract from the brightness of the image seen in the viewfinder. It is preferable to direct the concave surface of the disc 1 toward the field lens 3 of the viewfinder so that the ridges 2 can be conveniently and properly formed in the mold from which the disc 1 is manufactured.

In accordance with the present invention the disc 1 is fixed with optical elements or lenses 4 which advantageously have a collecting action and serve to simultaneously render visible in the viewfinder a sharp image of structure such as the scale 5 which provides indicia pertaining to the operation of the camera. Preferably the optical elements 4 are formed integrally with the disc 1. At the place where the scale 5 is shown in the drawings it is possible to locate a scale indicating the distance between the subject and the camera or other marks or symbols giving information with respect to the operation of the camera as well as, for example, the pointer of a light meter or scanning element. As is apparent from FIG. 1 the lens elements 4 provide a frame surrounding the concave surface of the disc 1 and the ridges 2, the elements 4 being in the form of a flange located at the periphery of the disc 1 and extending to the right therefrom, as viewed in FIG. 1 so that the elements 4 form a frame extending around the surface of the disc 1 which is provided with the ridges 2, and the inner contour 6 of the flange corresponds to the frame which will be exposed on the film so that in this way the flange 4 also serves to limit or frame the field of view of the viewfinder in a manner corresponding to the field of view of the objective so that the operator will see in the field of the viewfinder precisely what will be exposed on the film. In order to render the scale 5 more easily visible all parts of the left surface of the flange 4 at the periphery of the disc 1 as viewed in the drawing, except that through which the image of the frame 5 is seen may be colored or preferably darkened, so that in this way there will be a contrast providing an easily visible image of the scale 5. It is, however, also possible to provide a fluorescent coloring for the scale 5 as well as for the surface of the flange 4 which defines the contour 6 so that in this way the frame limits as well as the scale 5 will also be very easily visible in the field of the viewfinder.

A particularly advantageous construction is provided in accordance with the invention by using the flange 4 as elements for mounting other parts of the viewfinder such as, for example, the field lens 3. For this purpose, the right end face 7 of the flange 4 can have the field lens 3 cemented thereto so that in this way the flange 4 will act not only as an optical element providing an image of the scale 5 but also as a mounting for the lens 3 of the viewfinder. Moreover, it will be seen that with this construction the endless flange 4 together with the disc 1 and the field lens 3 define a closed space in which the ridges 2 are located so that in this way these ridges are protected against dust as well as against any possible injury. It should be noted, also, that if the disc 1 is made of a sufficient thickness then any dirt, smudges, or the like which may become located on the left surface of the disc 1, as viewed in FIG. 1, opposite from that surface which is provided with the ridges 2, will be rendered invisible when the objective is properly focused on the subject since when such a construction when there is proper focusing and the ridges 2 are no longer seen in the viewfinder any smudges or the like on the exterior surface of the disc 1 will also become invisible. The projections 7 used for mounting further optical elements can also have other desired construction in accordance with the particular elements which are to be mounted, such as, for example, roof prisms or pentaprisms or other lenses.

As is indicated in FIG. 3, it is not essential that the inner contour 6 define the frame limits of the viewfinder field. Thus it will be noted that in FIG. 3 the inner contour 6 of the lens elements 4 is somewhat different from the contour 6 shown in FIG. 1. Thus, this inner contour 6 of FIG. 3 will not define the frame limits, and instead for this purpose it is possible to use elements such as the projections 8 located, for example, on a surface of the field lens and situated at the corners of the frame which will be exposed on the film so as to indicate in this way to the operator the limits of the image as seen in the viewfinder which will correspond to the film frame.

Of course, further variations of the construction are possible. For example, peripheral portions of the curved disc 1 may be provided with a reflective coating which render the field limiting marks 8 visible in the viewfinder according to the Albada principle. Also, as was indicated above, the disc 1 may be flat instead of curved. Furthermore, the ridges 2, as required, may be situated either centrally or spaced from the center of the disc 1. The simplest structure is provided when the disc 1 is formed of a plastic transparent material.

It will be noted that with the structure of the invention the indicia, such as the scale 5, which is not situated in the focal plane of the viewfinder is nevertheless rendered visible without the use of any additional elements such as reflectors or the like, and furthermore the image of the indicium is seen simultaneously with the image of the subject in the viewfinder. Moreover, with the construction of the invention when the objective is properly focused on the subject an image of the highest brilliance will be provided in the viewfinder while when the objective is not properly focused the ridges 2 become immediately visible, and in addition by locating the ridges 2 substantially at the central portion of the disc 1, as is apparent from FIGS. 1 and 2, any lack of sharpness at the pheripheral portions of the field will have no undesirable influence on the adjusting of the camera. As was pointed out above, the location of the ridges 2 within a closed chamber protects these ridges from the influences of dust, from scratching, or from other injury. It will furthermore be noted that the entire structure of the invention is simple and inexpensive to manufacture as well as to assemble and mount on the camera, and in addition it occupies an extremely small amount of space.

It will be understood that each of the elements described above or two or more together, may also find a useful application in other types of viewfinders differing from the types described above.

While the invention has been illustrated and described as embodied in viewfinders particularly for reflex cameras, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim:

What is claimed and desired to be secured by Letters Patent is:

In a viewfinder, in combination, a transparent disc having on one face a series of small ridges of prismatic cross section, said disc being located in the focal plane of the viewfinder and said ridges being invisible only when the objective of the camera which carries the viewfinder is sharply focused on a subject to be photographed, said disc being integrally connected at its outer periphery with a transparent flange extending from said disc beyond the face thereof which carries said ridges and surrounding the face which carries said ridges and said flange terminating in an end face located to one side of said disc, said flange having a lens portion forming part of said flange; a field lens having a diameter greater than the diameter of said transparent disc and fixed to said end face of said flange superimposed also on said lens portion of said flange and defining with said disc a completely enclosed space in which said ridges are located; and indicia for indicating information pertinent to the operation of the camera located adjacent said lens portion of said flange at the side thereof opposite from said field lens so that said lens portion of said flange together with the corresponding portion of said field lens provides in the viewfinder a sharp image of said indicia simultaneously with the viewing of an image of the subject in the viewfinder.

References Cited by the Examiner

UNITED STATES PATENTS

| 2,992,599 | 7/61 | Jurenz | 88—1.5 X |
| 3,003,387 | 10/61 | Schiele | 88—1.5 X |

FOREIGN PATENTS 1,107,591  8/55  France.

NORTON ANSHER, *Primary Examiner.*

JOHN M. HORAN, *Examiner.*